(12) United States Patent
Srinivasan et al.

(10) Patent No.: US 12,267,415 B2
(45) Date of Patent: Apr. 1, 2025

(54) CRYPTOGRAPHIC KEY MIGRATION

(71) Applicant: Salesforce, Inc., San Francisco, CA (US)

(72) Inventors: Sudhir Srinivasan, San Francisco, CA (US); Jing Jin, Bellevue, WA (US)

(73) Assignee: Salesforce, Inc., San Francisco, CA (US)

( * ) Notice: Subject to any disclaimer, the term of this patent is extended or adjusted under 35 U.S.C. 154(b) by 252 days.

(21) Appl. No.: 18/102,555

(22) Filed: Jan. 27, 2023

(65) Prior Publication Data
US 2024/0259188 A1    Aug. 1, 2024

(51) Int. Cl.
*H04L 9/08*    (2006.01)
(52) U.S. Cl.
CPC .......... *H04L 9/0825* (2013.01); *H04L 9/0866* (2013.01); *H04L 9/0894* (2013.01)
(58) Field of Classification Search
CPC ... H04L 9/0825; H04L 9/0866; H04L 9/0894; H04L 9/083
See application file for complete search history.

(56) References Cited

U.S. PATENT DOCUMENTS

| | | | |
|---|---|---|---|
| 10,382,408 B1* | 8/2019 | Ahmed | G06F 21/606 |
| 10,922,132 B1* | 2/2021 | Shiramshetti | G06F 21/53 |
| 11,093,272 B2* | 8/2021 | Candido De Lima, Jr. | G06F 8/77 |
| 11,157,630 B2* | 10/2021 | Peddada | G06F 21/602 |
| 11,374,748 B2* | 6/2022 | Hosur | G06F 21/602 |
| 11,762,846 B1* | 9/2023 | Atherton | G06F 16/27 713/193 |
| 2017/0244693 A1* | 8/2017 | Papadopoulos | H04L 9/0861 |
| 2018/0060596 A1* | 3/2018 | Hamel | H04L 9/088 |
| 2018/0060600 A1* | 3/2018 | Hamel | H04L 9/0891 |
| 2018/0062835 A1* | 3/2018 | Hamel | H04L 9/0822 |
| 2018/0254901 A1* | 9/2018 | Egorov | H04L 9/0822 |
| 2019/0132299 A1* | 5/2019 | Tucker | H04W 12/0431 |
| 2019/0173674 A1* | 6/2019 | Agarwal | H04L 9/0891 |
| 2019/0228187 A1* | 7/2019 | Hu | G06F 21/602 |

(Continued)

OTHER PUBLICATIONS

Huang, Xiaolong, and Ruining Chen. "A survey of key management service in cloud." 2018 IEEE 9th International Conference on Software Engineering and Service Science (ICSESS). IEEE, 2018.*

(Continued)

*Primary Examiner* — Jimmy H Tran
(74) *Attorney, Agent, or Firm* — Butzel Long

(57) ABSTRACT

Systems, devices, and techniques are disclosed for cryptographic key migration. A tenant host may determine a first Key Management Service (KMS) indicated as storing a cryptographic key associated with the tenant host from a new KMS mapping. The tenant host may send a request for the cryptographic key associated with the tenant host to the first KMS. The tenant host may receive an indication from the first KMS that the first KMS does not store the cryptographic key. The tenant host may determine a second KMS indicated as storing the cryptographic key associated with the tenant host from an original KMS mapping. The tenant host may receive the cryptographic key associated with the tenant host from the second KMS. The tenant host may send a request to the second KMS that the cryptographic key associated with the tenant host be replicated from the second KMS to the first KMS.

20 Claims, 15 Drawing Sheets

(56) References Cited

U.S. PATENT DOCUMENTS

| | | | |
|---|---|---|---|
| 2019/0340251 A1* | 11/2019 | Peddada | H04L 9/16 |
| 2020/0034560 A1* | 1/2020 | Natanzon | H04L 63/0442 |
| 2020/0053065 A1* | 2/2020 | Wisniewski | H04L 63/06 |
| 2020/0250325 A1* | 8/2020 | Chong | G06F 21/6218 |
| 2021/0036851 A1* | 2/2021 | Villapakkam | G06F 21/602 |
| 2021/0377020 A1* | 12/2021 | Kashid | H04L 9/083 |
| 2022/0329413 A1* | 10/2022 | Schindewolf | G06F 21/602 |
| 2022/0329422 A1* | 10/2022 | Lin | H04L 9/50 |
| 2022/0385459 A1* | 12/2022 | Thomsen | H04L 9/0643 |
| 2023/0027329 A1* | 1/2023 | Durham | G06F 21/602 |
| 2023/0179413 A1* | 6/2023 | Kumarji | H04L 9/14 380/277 |
| 2023/0179576 A1* | 6/2023 | Hornsby | H04L 63/029 713/168 |
| 2023/0246818 A1* | 8/2023 | Peddada | H04L 9/0825 713/171 |

OTHER PUBLICATIONS

Luo, Shiyu, Zhichao Hua, and Yubin Xia. "TZ-KMS: A secure key management service for joint cloud computing with ARM TrustZone." 2018 IEEE Symposium on Service-Oriented System Engineering (SOSE). IEEE, 2018.*

Fahmideh, Mahdi, et al. "Knowledge Management for Cloud Computing Field." arXiv preprint arXiv:2202.07875 (2022).*

* cited by examiner

| New KMS Mapping 102 | |
|---|---|
| Tenant | KMS |
| A | X |
| B | X |
| C | X |
| D | Y |
| E | Y |
| F | Z |
| G | Z |
| H | Z |

| Original KMS Mapping 103 | |
|---|---|
| Tenant | KMS |
| A | Y |
| B | X |
| C | X |
| D | Z |
| E | Z |
| F | Y |
| G | X |
| H | Z |

Fig. 3

CRYPTOGRAPHIC KEY MIGRATION

BACKGROUND

A cloud computing server system may include multiple data storage centers that may be physically distinct from each other and geographically dispersed. The data stored in the data storage centers may be encrypted. The keys needed to work with encrypted data stored in one data storage center may be stored at a different data storage center. This may create a risk that the keys to data stored at one data storage center could be lost due to the decommissioning of the different data storage center that stores them. To mitigate this risk, keys may need to be moved from the data storage center that stores them to the data storage centers that store the data they are used to encrypt and decrypt. This can result in interrupting access to the keys, making the encrypted data the keys are used to work with inaccessible until the moving of the keys is completed.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 3 shows an example arrangement suitable for cryptographic key migration according to an implementation of the disclosed subject matter.

DETAILED DESCRIPTION

Figure 1:
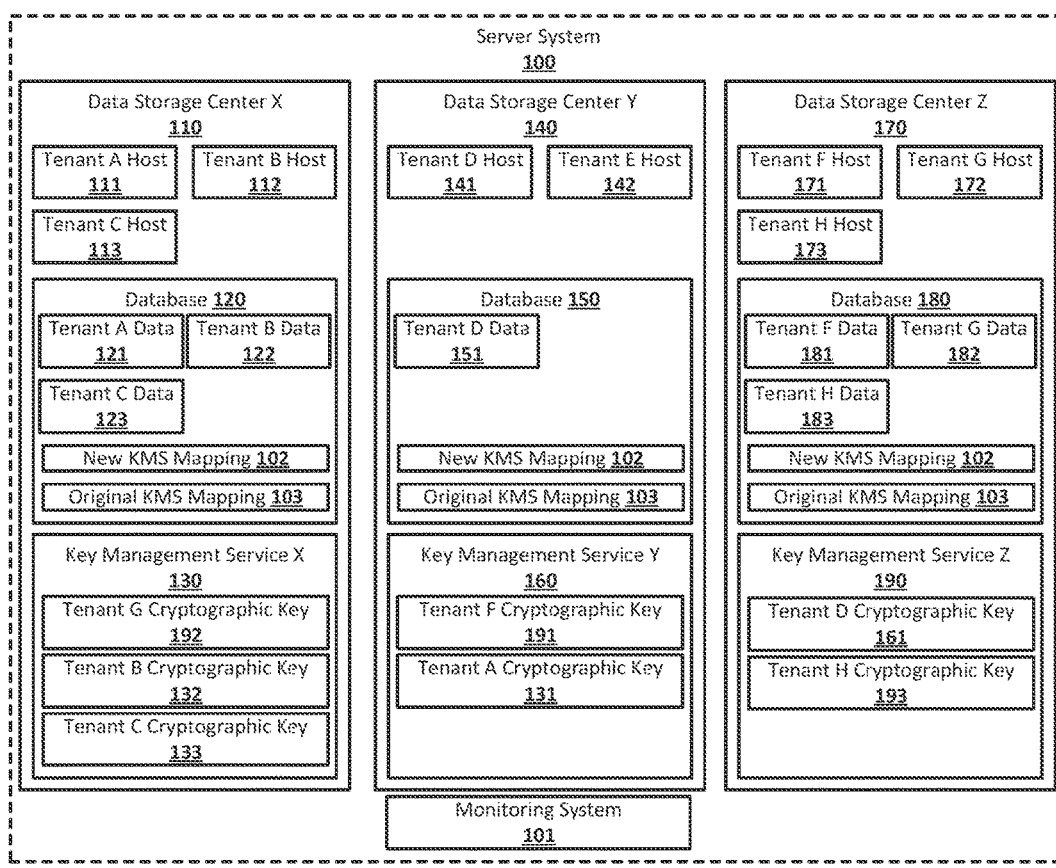
FIG. 1 shows an example system suitable for cryptographic key migration according to an implementation of the disclosed subject matter.

Techniques disclosed herein enable cryptographic key migration, which may allow for the migration of cryptographic keys without disrupting access to encrypted data. A tenant host may determine a first key management service (KMS) that may be indicated as storing a cryptographic key associated with the tenant host from a new KMS mapping. The tenant host may send a request for the cryptographic key associated with the tenant host to the first KMS. The tenant host may receive an indication from the first KMS that the first KMS does not store the cryptographic key associated with the tenant host. The tenant host may determine a second KMS that may be indicated as storing the cryptographic key associated with the tenant host from an original KMS mapping. The tenant host may receive, from the second KMS, the cryptographic key associated with the tenant host. The tenant host may send to the second KMS a request that the cryptographic key associated with the tenant host be replicated from the second KMS to the first KMS.

A tenant host may determine a first KMS that may be indicated as storing a cryptographic key associated with the tenant host from a new KMS mapping. A cloud computing server system may be a multi-tenant system that may have any number of tenants. Each tenant of the cloud computing server system may have its own data. The data for a tenant may be stored in a data storage center of the cloud computing server system. The cloud computing server system may have multiple data storage centers that may be geographically disparate. Different data storage centers may store data for different tenants, for example, using BLOB storage or structured storage, and each tenant may have its data stored at one data storage center. Each tenant may have its own tenant host that runs on the cloud computing server system. A tenant host for a tenant may be used to access that tenant's data from the data storage center, including reading and modifying existing data and writing new data. Each tenant's data may be accessible only to users associated with that tenant and not to users who associated with other tenants of the cloud computing server system. All data from all tenants may be encrypted using any suitable form of encryption, and the cryptographic keys used to encrypt tenants' data may be stored in KMSs that may be part of the data storage centers. Each data storage center may have its own KMS, resulting in the cloud computing server system having multiple KMSs. The KMSs may control access to the cryptographic keys to ensure that only users associated with a tenant are able to access that tenant's stored data. A tenant host may need the cryptographic key that was used encrypt its tenant's data to perform operations with that data. This cryptographic key may be associated with the tenant host. When the tenant host starts running on a computing device of a data storage center, the tenant host may perform a lookup on a new KMS mapping to determine which KMS stores the cryptographic key associated with the tenant host. The new KMS mapping may be a mapping, stored in any suitable format, that may indicate which cryptographic keys should be stored on the different KMSs of the cloud computing server system. The new KMS mapping may be a desired mapping indicating where all the cryptographic keys in a cloud computing server system should be stored after the completion of cryptographic key migration. The new KMS mapping may be generated before cryptographic migration is started on the cloud computing server system. This may result in some cryptographic keys not being stored on the KMS indicated as storing them in the new KMS mapping before the cryptographic key migration has been completed. The first KMS may be the KMS indicated by the new KMS mapping as storing the tenant host's associated cryptographic key and may be, for example, the KMS that is located at the data storage center that stores the data for tenant host's tenant and where the tenant host runs.

The tenant host may send a request for the cryptographic key associated with the tenant host to the first KMS. After determining the first KMS as the KMS that the new KMS mapping indicates stores the tenant host's associated cryptographic key, the tenant host may request its associated cryptographic key from the first KMS. The request may be sent in any suitable manner, such as, for example, through an API request to a service of the first KMS.

The first KMS may, on receiving the request from the tenant host, determine if it actually stores the cryptographic key associated with the tenant host. If the first KMS determines that it does store the cryptographic key associated with the tenant host, the first KMS may send that cryptographic key to the tenant host in any suitable manner, such as, for example, through an API response. The tenant host may receive the cryptographic key and begin operating on the tenant host's tenant's data in the data storage center. The tenant host may also generate an event record, or metric, indicating that the cryptographic key associated with the tenant host is stored on the first KMS server as indicated in the new KMS mapping. The event record may be sent to a monitoring system that may track cryptographic key migration in the cloud computing server system. Otherwise, the first KMS to which the tenant host sent the request may determine that it does not store the cryptographic key associated with the tenant host.

The tenant host may receive an indication from the first KMS that the first KMS does not store the cryptographic key associated with the tenant host after the first KMS determines that it does not store the cryptographic key associated with the tenant host This may occur when the cryptographic key has not yet been migrated to the first KMS, or has not yet been generated. A message from the first KMS, sent in any suitable format, such as, for example, an API response, may be received by the tenant host. The message may indicate that the first KMS does not store the cryptographic key associated with the tenant host.

The tenant host may determine a second KMS that may be indicated as storing the cryptographic key associated with the tenant host from an original KMS mapping. After the tenant host receives the message indicating that the first KMS does not store that cryptographic key, the tenant host may perform a lookup on an original KMS mapping to determine a second KMS that is indicated as storing the cryptographic key associated with the tenant host. The original KMS mapping may be a mapping, stored in any suitable format, that may indicate which cryptographic keys were stored on the different KMSs of the cloud computing server system before the start of cryptographic key migration on the cloud computing server system. The original KMS mapping may be a mapping of where all the cryptographic keys in a cloud computing server system were actually stored before the start of cryptographic key migration and may be generated before the cryptographic migration is started on the cloud computing server system. The second KMS, indicated by the original KMS mapping as storing the tenant host's associated cryptographic key may be, for example, a KMS that is located at a different data storage center than the data storage center that stores the data for tenant host's tenant and where the tenant host runs.

The tenant host may send a request for the cryptographic key associated with the tenant host to the second KMS. After determining the second KMS as the KMS that the original KMS mapping indicates stores the tenant host's associated cryptographic key, the tenant host may request its associated cryptographic key from the second KMS. The request may be sent in any suitable manner, such as, for example, through an API request to a service of the second KMS.

The second KMS may, on receiving the request from the tenant host, determine if it actually stores the cryptographic key associated with the tenant host. If the second KMS determines that it does store the cryptographic key associated with the tenant host, the second KMS may send that cryptographic key to the tenant host in any suitable manner, such as, for example, through an API response. The tenant host may receive the cryptographic key from the second KMS, cache the cryptographic key, and use the cryptographic key to work with the tenant's data from the data storage center in which it is stored, for example, decrypting data to be read and modified, and encrypting newly stored and modified data. The tenant host may also send to the second KMS a request that the cryptographic key associated with the tenant host be replicated from the second KMS to the first KMS. The request may be sent in any suitable manner, such as, for example, as an API request to a service of the second KMS. The tenant host may generate an event record, or metric, indicating that the replication of the cryptographic key associated with the tenant host was initiated. The event record may be sent to the monitoring system.

The second KMS may replicate the cryptographic key associated with the tenant host to the first KMS. The replication of the cryptographic key associated with the tenant host from the second KMS to the first KMS may be done asynchronously. While the tenant host is still operating with its associated cryptographic key as received from the second KMS, the second KMS may replicate the cryptographic key associated with the tenant host to the first KMS. This may ensure that the replication occurs while the tenant host has a cached copy of the cryptographic key to operate with while the tenant host is running and thus does not need to attempt to obtain the cryptographic key so that the tenant host is not affected by unavailability of the cryptographic key during the replication. The replication may migrate the cryptographic key associated with the tenant host to the first KMS. Upon its next restart, the tenant host may have discarded the cached copy of its associated cryptographic key while being shut down, and may again use the new KMS mapping to determine which KMS to request the tenant host's associated cryptographic key form, which may again be the first KMS. Because the cryptographic key was replicated to the first KMS while the tenant host was operating with its cached copy of the cryptographic key received from the second KMS, the first KMS may determine that it does store the cryptographic key associated with the tenant host and may send that cryptographic key to the tenant host. The tenant host may no longer need to use the original KMS mapping. The cryptographic key associated with the tenant host may be stored on the first KMS, which may, for example, be a KMS that is located at the same data storage center that stores the data for the tenant host's tenant, although in some implementations may be any KMS in the cloud computing server system that is not the second KMS. The cryptographic key may then be safely removed from the second KMS.

If the second KMS, after receiving the request from the tenant host, determines that it does not store the cryptographic key associated with the tenant host, this may indicate that no cryptographic key associated with the tenant host exists in the cloud computing server system. For example, the tenant host may have been newly added to the cloud computing server system. The tenant host may receive an indication from the second KMS that the second KMS does not store the cryptographic key associated with the tenant host. A message from the second KMS, sent in any suitable format, such as, for example, an API response, may be received by the tenant host. The message may indicate that the second KMS does not store the cryptographic key associated with the tenant host.

The tenant host may, in response to the message from the second KMS that the second KMS does not store the cryptographic key associated with the tenant host, send a request to the first KMS that the first KMS generate a cryptographic key for the tenant host. The request may be sent in any suitable manner, such as through an API request to a service of the first KMS. The first KMS may generate and store a cryptographic key associated with the tenant host. Once the cryptographic key associated with the tenant host has been generated, the first KMS may send the cryptographic key associated with the tenant host to the tenant host, for example, as an API response to another request from the tenant host. The tenant host may then start using the cryptographic key to work with the tenant host's tenant's data in the data storage center, encrypting and decrypting the data. The tenant host may generate an event record, or metric, indicating that the generation of a new cryptographic key associated with the tenant host was completed. The event record may be sent to the monitoring system.

As different tenant hosts of the cloud computing server system start and restart, any cryptographic keys not stored by the KMSs indicated in the new KMS mapping may be migrated from the KMSs that do store them to the KMSs indicated in the new KMS mapping through replication. The replication of the cryptographic key for any tenant host may always occur while that tenant is operating with a cached copy of its associated cryptographic key so that the tenant hosts normal operation is not interrupted. New tenant hosts may have their cryptographic keys generated and stored on the KMS indicated by the new KMS mapping. Over time, all tenant hosts of the cloud computing server system will be able to receive their associated cryptographic keys from the KMSs indicated by the new KMS mapping as storing those cryptographic keys, and will no longer need to use the original KMS mapping, completing the cryptographic key migration for the cloud computing server system. If, for example, the new KMS mapping indicates that for each tenant host, the KMS that stores the tenant host's associated cryptographic key is the KMS located as the same data storage center as the tenant host, then completion of the cryptographic key migration may result in all tenant hosts being located at the same data storage center as their associated cryptographic keys. This may mitigate the risk that decommissioning a data storage center, including any KMSs at that data storage center, may result in a tenant host at a different data storage center losing access to their associated cryptographic keys. The monitoring system may allow the cryptographic key migration to be monitored through the event records generated by the tenant hosts, making it easier to determine the progress and completion of the cryptographic key migration.

FIG. 1 shows an example system suitable for cryptographic key migration according to an implementation of the disclosed subject matter. A server system 100 may be, for example, a cloud computing server system that may include computing devices that may be, for example, the computer 20 as described in FIG. 9, or components thereof. The server system 100 may include any number computing devices, each of which may include any suitable combination of central processing units (CPUs), graphical processing units (GPUs), and tensor processing units (TPUs). The server system 100 may be distributed over any geographic area, and may, for example, include geographically disparate computing devices connected through any suitable network connections.

The server system 100 may include data storage center X 110, data storage center Y 140, and data storage center Z 170. The data storage center X 110, data storage center Y 140, and data storage center Z 170 may include the computational resources of the server system 100 in the form of any number of computing devices and may operate with some level of independence within the server system 100. The data storage center X 110, data storage center Y 140, and data storage center Z 170 may be located in geographically disparate locations and may be connected to each other through any suitable form of network connection. The server system 100 may include other data storage centers, and may include hardware and software resources for the management of the data storage centers, including the include data storage center X 110, data storage center Y 140, and data storage center Z 170

Each of the data storage center X 110, data storage center Y 140, and data storage center Z 170 may include some number of tenant hosts that may be software running on the computing devices of the include data storage center X 110, data storage center Y 140, and data storage center Z 170 and may be used by tenants of the server system 100 to access the computational resources of the server system 100. For example, the data storage center X 110 may include a tenant A host 111, tenant B 112, and tenant C host 113, which may be the tenant hosts for tenants A, B, and C, respectively, the data storage center Y 140 may include a tenant D host 141 and a tenant E host 142, which may be the tenant hosts for the tenants D and E, respectively, and the data storage center Z 170 may include a tenant F host 171, a tenant G host 172, and a tenant H host 173, which may be the tenant hosts for the tenants F, G, and H, respectively Each of the data storage center X 110, data storage center Y 140, and data storage center Z 170 may include a database that may store data for their respective tenants. For example, the database 120 of the data storage center X 110 may store tenant A data 121, tenant B data 122, and tenant C data 123, which may be data belonging to the tenants A, B, and C, respectively, the database 150 of the data storage center Y 140 may store tenant D data 151, which may be data belonging to the tenants D, and database 180 of the data storage center Z 170 may store tenant F data 181, tenant G data 182, and tenant H data 183, which may be data belonging to the tenants F, G, and H, respectively. No data may be stored in the database 150 for the tenant E because, for example, the tenant E may be a new tenant of the server system 100. The databases 120, 150, and 180 may use any suitable physical storage of the server system 100. The tenant data stored in the databases 120, 150, and 180 may be kept separate through controlling tenant data access to data and may be encrypted using cryptographic keys that are unique to each tenant and associated with each tenant's tenant host.

The databases 120, 150, and 180 may also each store a copy of a new KMS mapping 102 and an original KMS 103. The new KMS mapping 102 may be a mapping showing which tenant's cryptographic keys should be stored on the various KMSs of the server system 100 after cryptographic key migration is completed on the server system 100. The new KMS mapping 102 may have been generated in any suitable manner, including, for example, as an automatic mapping that maps tenant's cryptographic keys to the KMS of the data storage center at which the tenant's data is stored. The original KMS mapping 103 may be a mapping showing which tenant's cryptographic keys are stored on the various KMSs of the server system 100, for example, before cryptographic key migration has been performed on the server system 100. The original KMS mapping 103 may be generated in any suitable manner, such as, for example, adding entries to mappings whenever cryptographic keys were generated on the server system 100 and stored on a KMS before the start of cryptographic key migration on the server system 100.

Each of the data storage center X 110, data storage center Y 140, and data storage center Z 170 may include a KMS that may store and manage cryptographic keys for tenants of the server system 100 using physical storage and computing devices within the data storage centers. For example, the data storage center X 110 may include a key management service X 130 that may store a tenant G cryptographic key 192, a tenant B cryptographic key 132, and a tenant C cryptographic key 133 for the respective tenants G, B, and C, the data storage center Y 140 may include a key management service Y 160 that may store a tenant F cryptographic key 191 and a tenant A cryptographic key 131, for the respective tenants F and A, and the data storage center Z 170 may include a key management service Z 190 that may store a tenant D cryptographic key 161 and a tenant H cryptographic key 193 for the respective tenants D and H. The tenant's cryptographic keys may be associated with their respective tenant hosts and may be used to encrypt and decrypt their respective tenant's data. For example, the tenant F cryptographic key 191 may be associated with the tenant F host 171 and may be used by the tenant F host 171 to perform operations with the tenant F data 181, allowing for encryption and decryption. The key management service Y 160 may only provide the tenant F cryptographic key 191 to the tenant F host 171, or any party which has been provided appropriate credentials and permissions by the tenant F. The cryptographic key for a tenant may not always be stored on the KMS of the data storage center that stores the tenant's data and runs the tenant's host. For example, the tenant A host 111 and the tenant A data 121 may be in the data storage center X but the tenant A cryptographic key 131, associated with the tenant A host 111 and used decrypt and encrypt the tenant A data 121, may be stored in the key management service Y 160 in the data storage center Y 140. A new tenant host may not have a cryptographic key stored in any KMS of the server system 100. For example, the newly created tenant E host 142 may have no cryptographic key in any of the key management service X 130, key management service Y 160, and key management service Z 190.

The server system 100 may include a monitoring system 100. The monitoring system 100 may be any suitable combination of hardware and software of the server system 100 for monitoring and allow visibility into the progress of cryptographic key migration. The monitoring system 100 may, for example, receive event records, or metrics, from tenant hosts of the server system 100 that may indicate when requests to replicate cryptographic keys have been made, when a cryptographic key has been found in KMS indicated in the new KMS mapping 102, and when a cryptographic key has been generated for a new tenant host. This may allow for the determination of when all cryptographic keys in the server system 100 are located in the KMS indicated in the new KMS mapping 102, and for visibility into the progress of cryptographic key migration on the server system 100.

Figure 2:
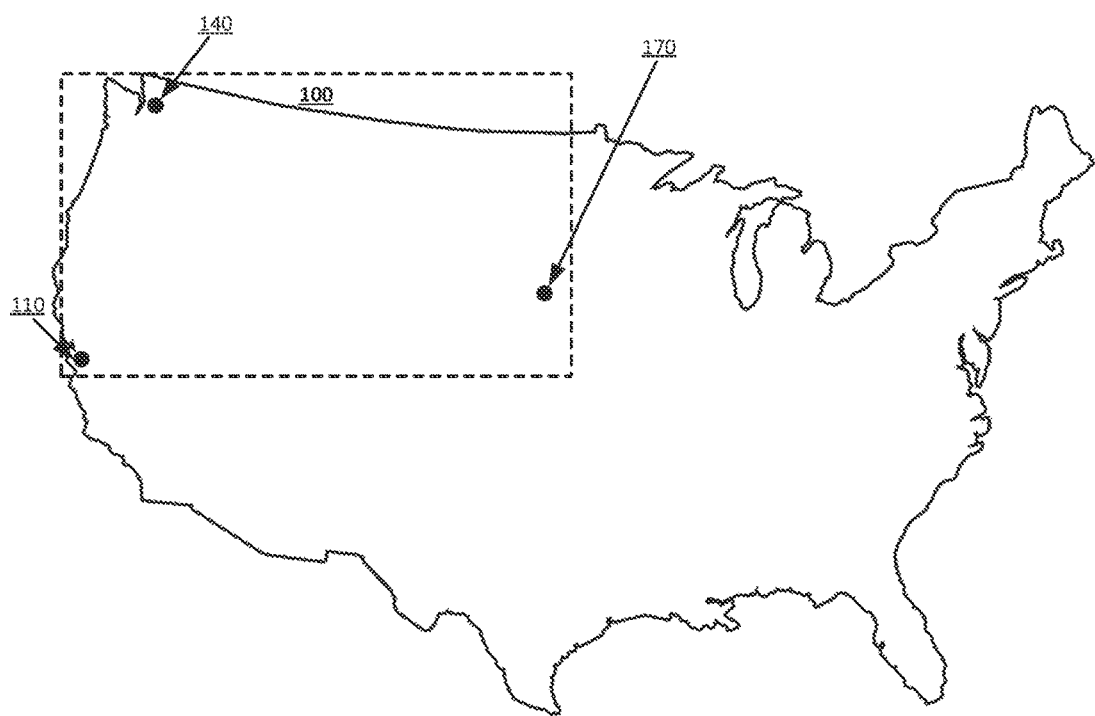
FIG. 2 shows an example arrangement suitable for cryptographic key migration according to an implementation of the disclosed subject matter.

FIG. 2 shows an example arrangement suitable for cryptographic key migration according to an implementation of the disclosed subject matter. The data storage centers of the server system 100 may be geographically disparate. For example, the data storage center X 110, data storage center Y 140, and data storage center Z 170 may be at separate physical locations and may be connected through any suitable wide area network connection as parts of the server system 100 allowing for communication between them.

FIG. 3 shows an example arrangement suitable for cryptographic key migration according to an implementation of the disclosed subject matter. The new KMS mapping 102 may be a second version mapping that indicates which KMS server should store the server system 100 tenants' cryptographic keys when cryptographic key migration is completed on the server system 100. The new KMS mapping 102 may be any suitable mapping between tenants and KMSs of the server system 100. This may include a mapping indicating that each tenant's cryptographic key should be stored at the data storage center that also stores that tenant's data and the tenant host for the tenant. For example, the new KMS mapping 102 may indicate that the tenant A cryptographic key 131, the tenant B cryptographic key 132, and the tenant C cryptographic key 133 should be stored on the key management service X 130 in the data storage center X 110, that the tenant D cryptographic key 161 and a tenant E cryptographic key should be stored on the key management service Y 160 in the data storage center Y 140, and that the tenant F cryptographic key 191, the tenant G cryptographic key 192, and the tenant H cryptographic key 193 should be stored on the key management service Z 190 in the data storage center Z 170. If a cryptographic key has not yet been generated, such as the tenant E cryptographic key, the new KMS mapping 102 may indicate where that cryptographic key should be stored once it is generated.

The original KMS mapping 103 may be a first version mapping that indicates which KMS server stores the server system 100 tenants' cryptographic keys before cryptographic key migration has started on the server system 100. The original KMS mapping 103 may be based on the actual storage locations of the cryptographic keys. For example, the original KMS mapping 103 may indicate that the tenant G cryptographic key 192, the tenant B cryptographic key 132, and the tenant C cryptographic key 133 are stored on the key management service X 130 in the data storage center X 110, that the tenant F cryptographic key 191 and the tenant A cryptographic key 131 are stored on the key management service Y 160 in the data management server Y 140, and that the tenant D cryptographic key 161, the tenant E cryptographic key and the tenant H cryptographic key 193 are be stored on the key management service Z 190 in the data storage center Z 170. If a cryptographic key has not yet been generated, such as the tenant E cryptographic key, the original KMS mapping 103 may indicate where that cryptographic key would be stored if it had been generated prior to the start of cryptographic key migration on the server system 100.

Figure 4A:
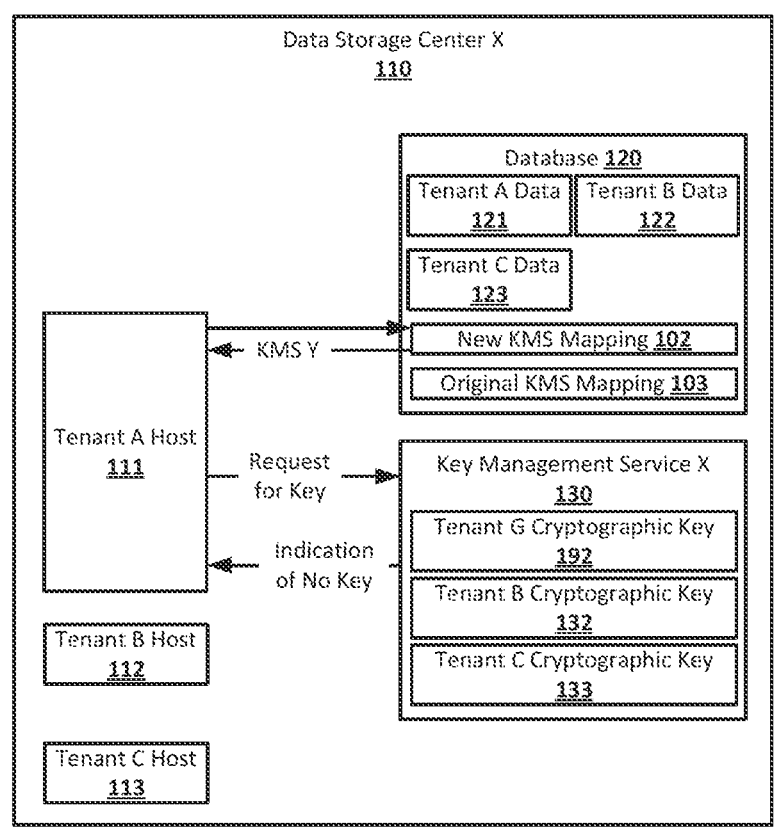
FIG. 4A shows an example arrangement suitable for cryptographic key migration according to an implementation of the disclosed subject matter.

FIG. 4A shows an example arrangement suitable for cryptographic key migration according to an implementation of the disclosed subject matter. Cryptographic key migration may be in progress on the server system 100. The tenant A host 111 may start up, for example, after being restarted, and may need to acquire its associated tenant A cryptographic key 131 in order to be able to perform operations on the tenant A data 121. The tenant A host 111 may perform a lookup on the new KMS mapping 102 to determine which KMS it indicates as storing the tenant A cryptographic key 131. The tenant A host 111 may determine that the new KMS mapping 102 indicates that the tenant A cryptographic key 131 is stored on the key management service X 130.

The tenant A host 111 may send a request for the tenant A cryptographic key 131 to the key management service X 130. The request may be sent, for example, through an API to a service of the key management service X 130. The request may include any suitable credentials from the tenant A host 111. The key management service X 130 may determine that it does not store the tenant A cryptographic key 131 and may send a message including an indication that it does not store this cryptographic key to the tenant A host 111.

Figure 4B:
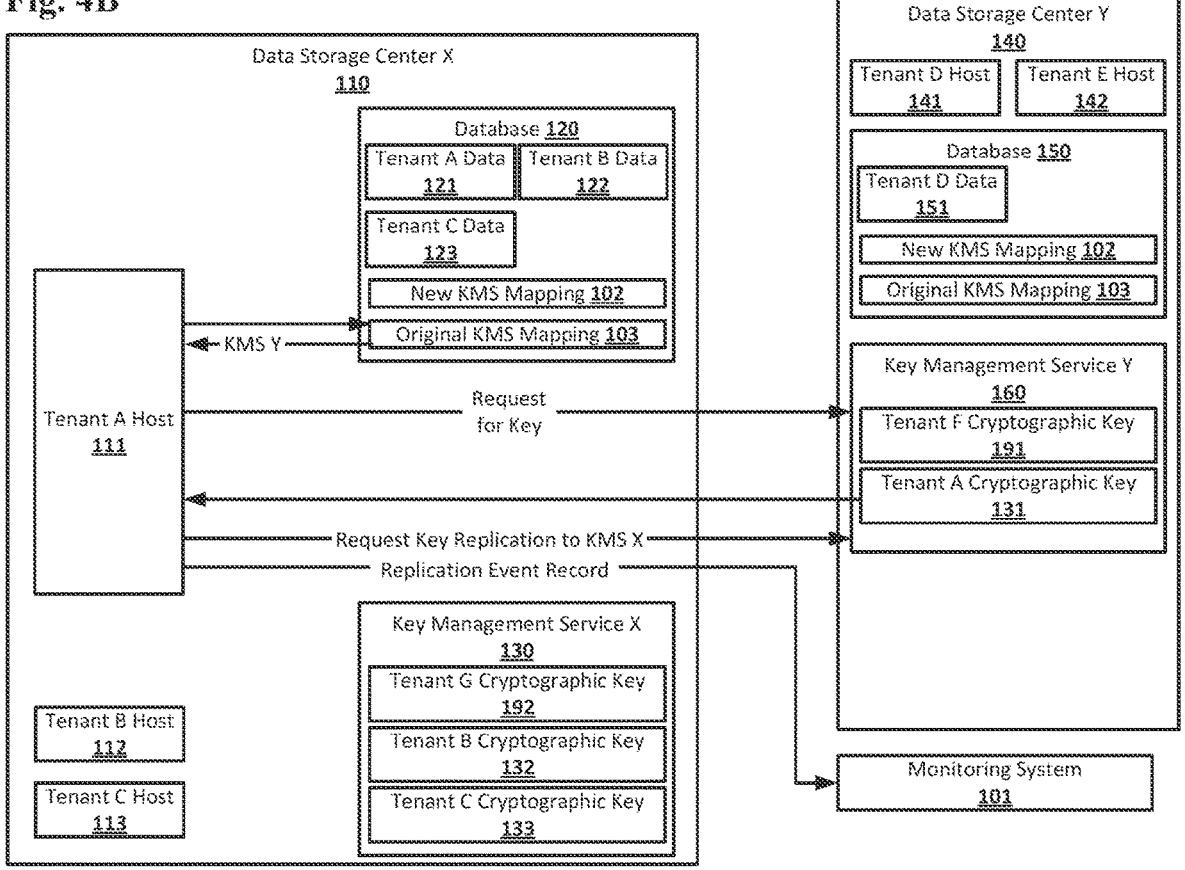
FIG. 4B shows an example arrangement suitable for cryptographic key migration according to an implementation of the disclosed subject matter.

FIG. 4B shows an example arrangement suitable for cryptographic key migration according to an implementation of the disclosed subject matter. After receiving the message indicating that the key management service X 130 does not store the tenant A cryptographic key 131, the tenant A host 111 may perform a lookup on the original KMS mapping 103 to determine which KMS it indicates as storing the tenant A cryptographic key 131. The tenant A host 111 may determine that the original KMS mapping 103 indicates that the tenant A cryptographic key 131 is stored on the key management service Y 160.

The tenant A host 111 may send a request for the tenant A cryptographic key 131 to the key management service Y 160. The request may be sent, for example, through an API to a service of the key management service Y 160. The request may include any suitable credentials from the tenant A host 111. The key management service Y 160 may determine that it does store the tenant A cryptographic key 131 and may send the tenant A cryptographic key 131 to the tenant A host 111. The tenant A host 111 may cache the tenant A cryptographic key 131.

The tenant A host 111 may send a request to key management service Y 160 to replicate the tenant A cryptographic key 131 to the key management service X 130. The request may be sent, for example, through an API to a service of the key management service Y 160. The tenant A host 111 may also generate an event record that indicates that the request to replicate the tenant A cryptographic key 131 to the key management service X 130 was sent to the key management service Y 160, and may send the event record to the monitoring system 101.

Figure 4C:
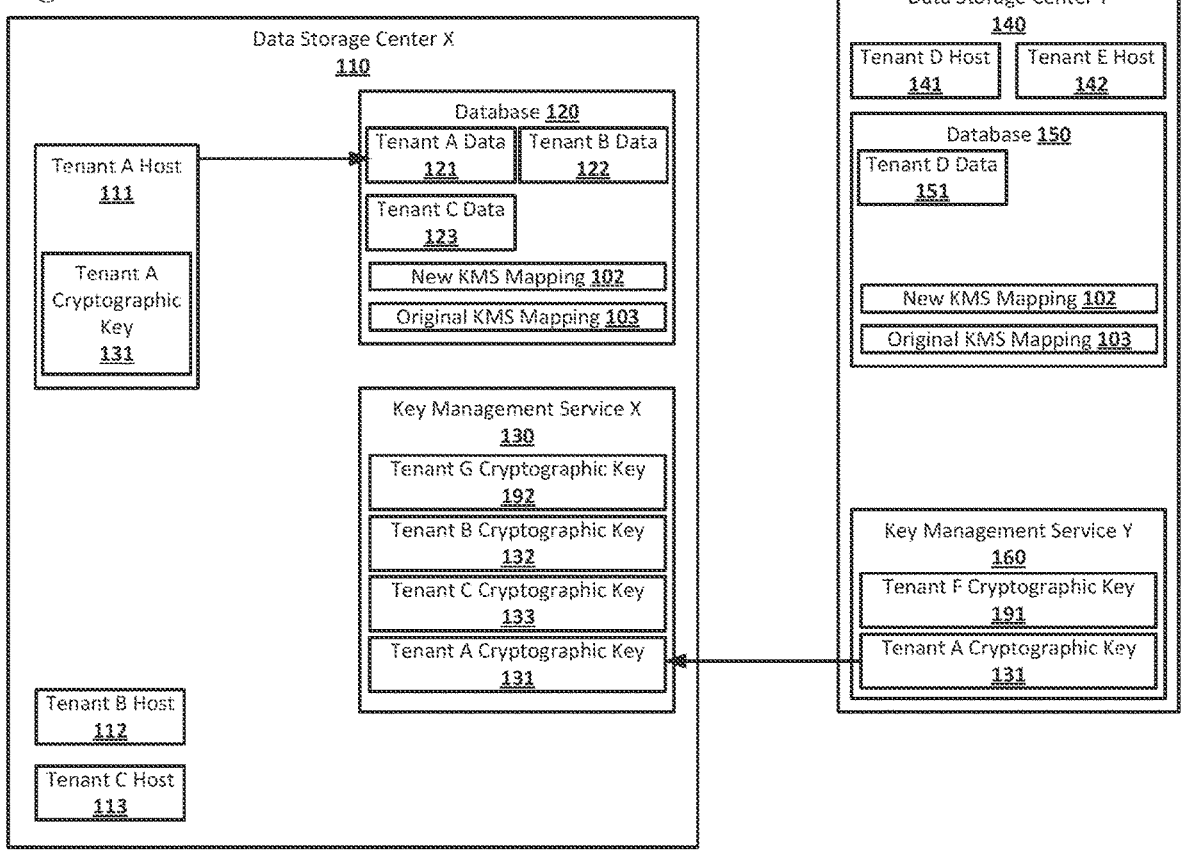
FIG. 4C shows an example arrangement suitable for cryptographic key migration according to an implementation of the disclosed subject matter.

FIG. 4C shows an example arrangement suitable for cryptographic key migration according to an implementation of the disclosed subject matter. The tenant A host 111 may operate normally, using its cached copy of the tenant A cryptographic key 131 to work with the tenant A data 121 in the database 120, encrypting and decrypting the tenant A data 121. During this time period, the key management service Y 160 may replicate the tenant A cryptographic key 131 to the key management service X 130. After replication, the tenant A cryptographic key 131 may be removed from the key management service Y 160.

Figure 4D:
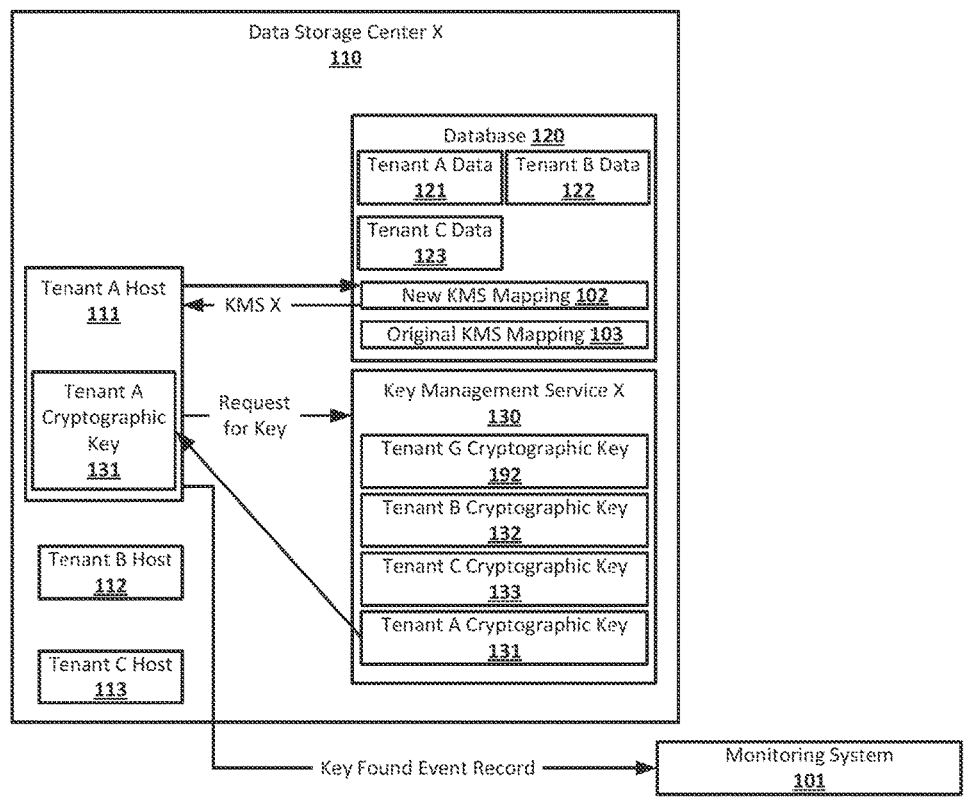
FIG. 4D shows an example arrangement suitable for cryptographic key migration according to an implementation of the disclosed subject matter.

FIG. 4D shows an example arrangement suitable for cryptographic key migration according to an implementation of the disclosed subject matter. The tenant A host 111 may restart, for example, in order for a software upgrade to be performed on the tenant A host 111. When the tenant A host 111 shuts down before restarting it my un-cache the tenant A cryptographic key 131, for example, deleting it from any memory in which it was stored by the tenant A cryptographic key 131. This may prevent the tenant A cryptographic key 131 from being stolen from the tenant A host 111.

Upon restarting, the tenant A host 131 may need to reacquire the tenant A cryptographic key 131 in order to perform operations on the tenant A data 121. The tenant A host 111 may perform a lookup on the new KMS mapping 102 to determine which KMS it indicates as storing the tenant A cryptographic key 131. The tenant A host 111 may determine that the new KMS mapping 102 indicates that the tenant A cryptographic key 131 is stored on the key management service X 130.

The tenant A host 111 may send a request for the tenant A cryptographic key 131 to the key management service X 130. The request may be sent, for example, through an API to a service of the key management service X 130. The request may include any suitable credentials from the tenant A host 111. The key management service X 130 may determine that it does store the tenant A cryptographic key 131 and may send the tenant A cryptographic key 131 to the tenant A host 111. The tenant A host 111 may cache the tenant A cryptographic key 131, which it may then be able to use to work with the tenant A data 121. The tenant A host 111 may also generate an event record indicating that the tenant A cryptographic key 131 was found in the key management service X 130 as indicated by the new KMS mapping 102. The event record may be sent to the monitoring system 101. The event record may indicate that the migration of the tenant A cryptographic key 131 has been completed. The tenant A host 111 may no longer need to check the original KMS mapping 103, as the new KMS mapping 102 now indicates the location where the tenant A cryptographic key 131 is stored, the key management service X 130.

Figure 5A:
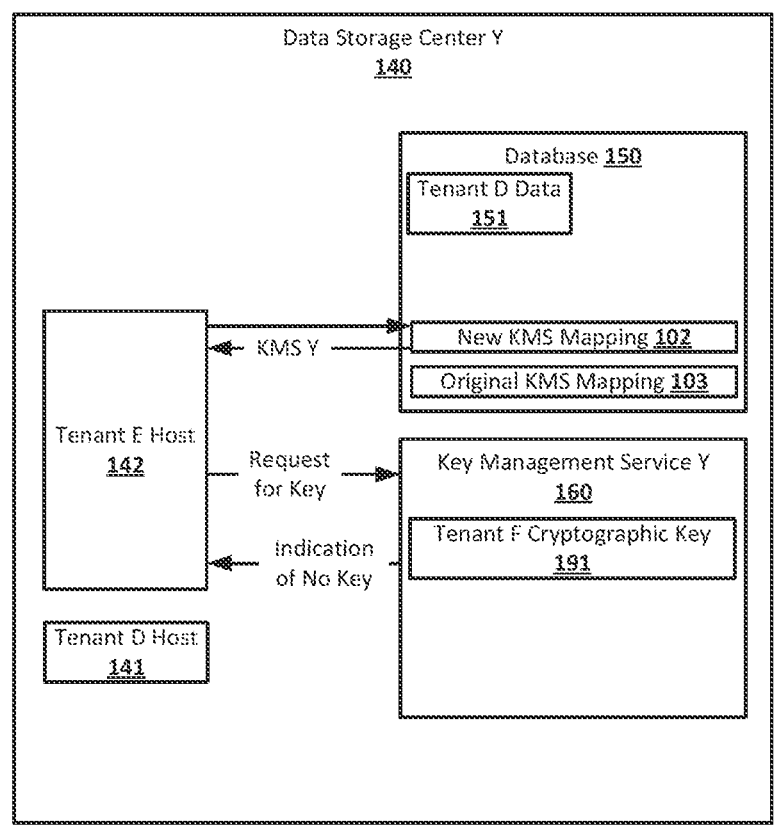
FIG. 5A shows an example arrangement suitable for cryptographic key migration according to an implementation of the disclosed subject matter.

FIG. 5A shows an example arrangement suitable for cryptographic key migration according to an implementation of the disclosed subject matter. Cryptographic key migration may be in progress on the server system 100. The tenant E host 142 may start up, for example, after being created, and may need to acquire its associated tenant E cryptographic key in order to be able to perform operations on tenant E data. The tenant E host 142 may perform a lookup on the new KMS mapping 102 to determine which KMS it indicates as storing the tenant E cryptographic key. The tenant E host 142 may determine that the new KMS mapping 102 indicates that the tenant E cryptographic key is stored on the key management service Y 160.

The tenant E host 142 may send a request for the tenant E cryptographic key to the key management service Y 160. The request may be sent, for example, through an API to a service of the key management service Y 160. The request may include any suitable credentials from the tenant E host 142. The key management service Y 160 may determine that it does not store the tenant E cryptographic key and may send a message including an indication that it does not store this cryptographic key to the tenant E host 142.

Figure 5B:
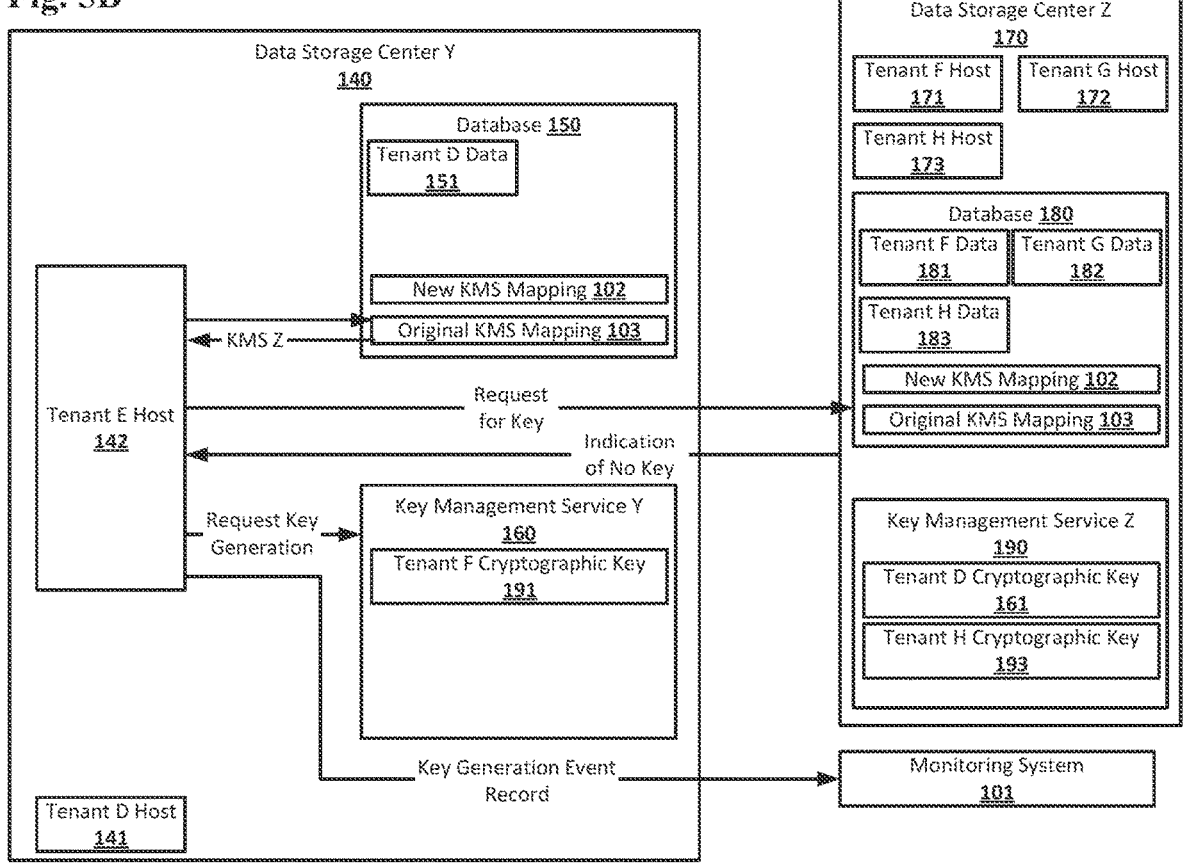
FIG. 5B shows an example arrangement suitable for cryptographic key migration according to an implementation of the disclosed subject matter.

FIG. 5B shows an example arrangement suitable for cryptographic key migration according to an implementation of the disclosed subject matter. After receiving the message indicating that the from the key management service Y 160 does not store the tenant E cryptographic key, the tenant E host 142 may perform a lookup on the original KMS mapping 103 to determine which KMS it indicates as storing the tenant E cryptographic key. The tenant E host 142 may determine that the original KMS mapping 103 indicates that the tenant E cryptographic key is stored on the key management service Z 190.

The tenant E host 142 may send a request for the tenant E cryptographic key to the key management service Z 190. The request may be sent, for example, through an API to a service of the key management service Z 190. The request may include any suitable credentials from the tenant E host 142. The key management service Z 190 may determine that it does not store the tenant E cryptographic key and may send a message including an indication that it does not store this cryptographic key to the tenant E host 142. This may indicate to the tenant E host 142 that the tenant E cryptographic key has not yet been generated due to the tenant E being a new tenant of the server system 100.

The tenant E host 142 may send a request to key management service Y 160 to generate the tenant E cryptographic key. The request may be sent, for example, through an API to a service of the key management service Y 160. The tenant E host 142 may send the request to generate the tenant E cryptographic key to the key management service Y 160 based on the key management service Y 160 being indicated in the new KMS mapping 102 as the location in which the tenant E cryptographic key should be stored. The tenant E host 142 may also generate an event record that indicates that the request to generate the tenant E cryptographic key was sent to the key management service Y 160 and may send the event record to the monitoring system 101.

Figure 5C:
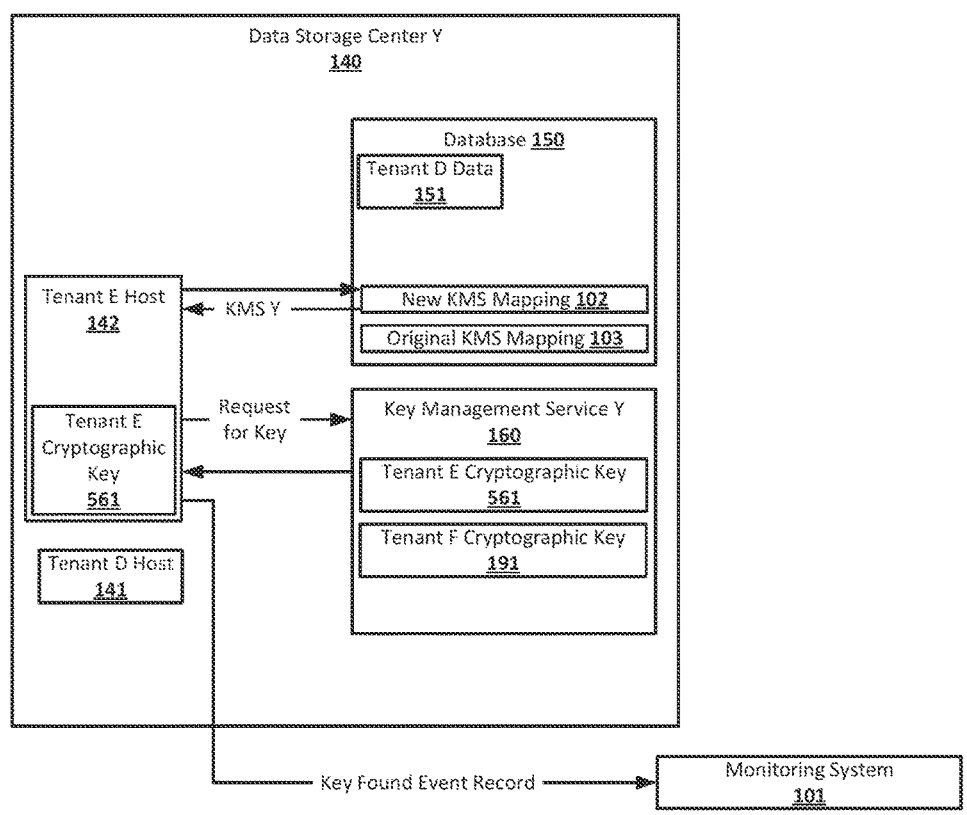
FIG. 5C shows an example arrangement suitable for cryptographic key migration according to an implementation of the disclosed subject matter.

FIG. 5C shows an example arrangement suitable for cryptographic key migration according to an implementation of the disclosed subject matter. The key management service Y 160 may generate and store a tenant E cryptographic key 561. The tenant E cryptographic key 561 may be generated in any suitable manner, and may be associated with the tenant E host 142 such that other tenant hosts of the server system 100 may not access the tenant E cryptographic key 561 unless provided with appropriate credentials, for example, by the tenant E host 142. The tenant E host 142 may continue operating during the generation of the tenant E cryptographic key 561, as there may be no data in the database 150 for the tenant E host 142 to perform operations on due to the tenant E being new and not having a cryptographic key, preventing the tenant E host 142 from having written any data to the database 150.

Sometime after requesting the generation of the tenant E cryptographic key 561, the tenant E host 142 may re-attempt to acquire the tenant E cryptographic key 561, which may now exist and be stored in the key management service Y 160. The tenant E host 142 may perform a lookup on the new KMS mapping 102 to determine which KMS it indicates as storing the tenant E cryptographic key 561. The tenant E host 142 may determine that the new KMS mapping 102 indicates that the tenant E cryptographic key 561 is stored on the key management service Y 130.

The tenant E host 142 may send a request for the tenant E cryptographic key 561 to the key management service Y 160. The request may be sent, for example, through an API to a service of the key management service Y 160. The request may include any suitable credentials from the tenant E host 142. The key management service Y 160 may determine that it does store the tenant E cryptographic key 561 and may send the tenant E cryptographic key 561 to the tenant E host 142. The tenant E host 142 may cache the tenant E cryptographic key 142, which it may then be able to use to work with the tenant A data 121. The tenant E host 142 may also generate an event record indicating the tenant E cryptographic key 161 was found in the key management service Y 160 as indicated by the new KMS mapping 102. The event record may be sent to the monitoring system 101. The tenant E host 142 may no longer need to check the original KMS mapping 103, as the new KMS mapping 102 now indicates the location where the tenant E cryptographic key 561 is stored, the key management service Y 160.

Figure 5D:
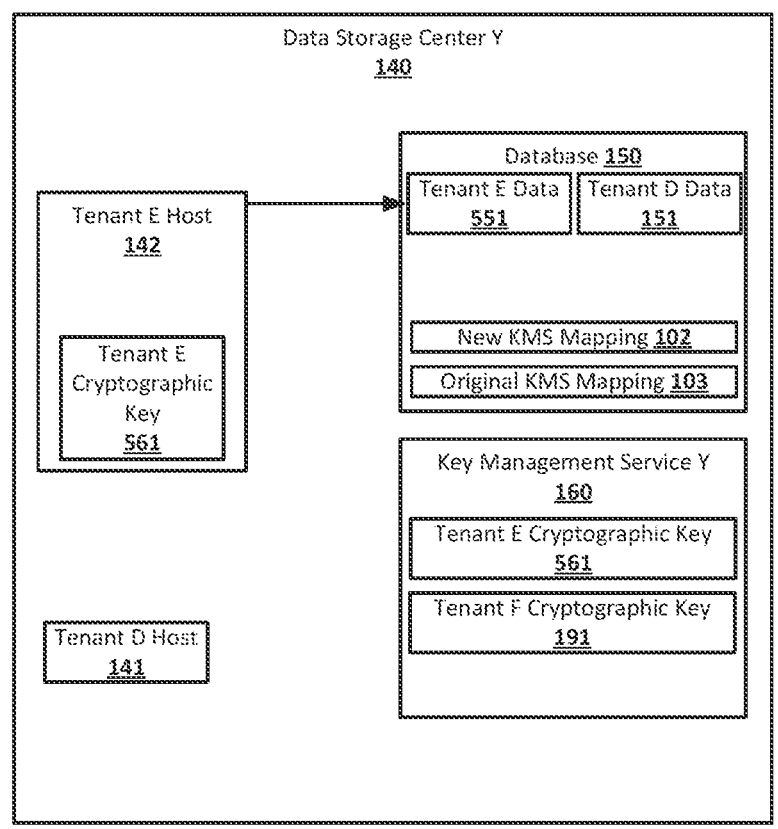
FIG. 5D shows an example arrangement suitable for cryptographic key migration according to an implementation of the disclosed subject matter.

FIG. 5D shows an example arrangement suitable for cryptographic key migration according to an implementation of the disclosed subject matter. The tenant E host 142 may use the tenant E cryptographic key 561 to add tenant E data 551 to the database 150. The tenant E data 551 may be data belonging to the tenant E and may be encrypted using the tenant E cryptographic key 561. The tenant E host 142 may then use the tenant E cryptographic key 561 to perform operations with the tenant E data 551, for example, encrypting and decrypting the data as necessary to read from and write to the tenant E data 551.

Figure 6:
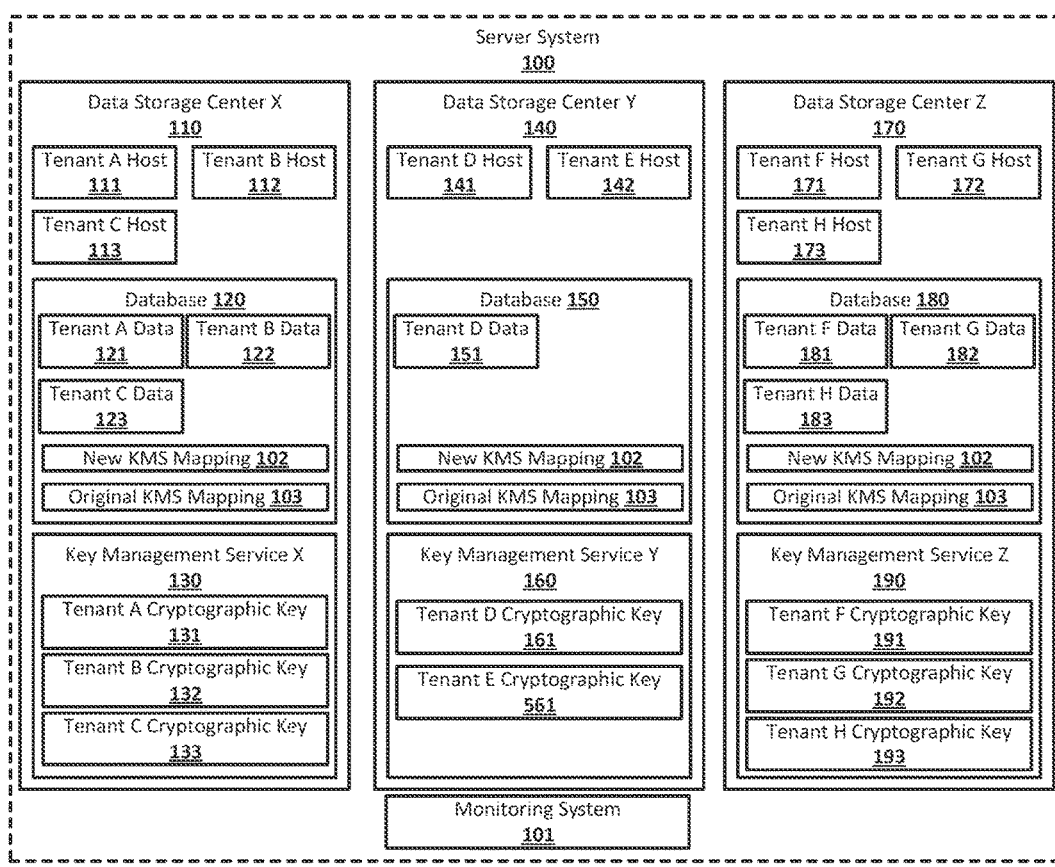
FIG. 6 shows an example system suitable for cryptographic key migration according to an implementation of the disclosed subject matter.

FIG. 6 shows an example system suitable for cryptographic key migration according to an implementation of the disclosed subject matter. Over time, all of the cryptographic keys associated with the tenant hosts of the server system 100 may migrate to the KMS at the same data storage center as their associated tenant host. For example, similar to the tenant A 111, the tenant F cryptographic key 191 may, at the start of the cryptographic key migration, be stored on the key management service Y 160, which may be indicated in the original KMS mapping 103. The new KMS mapping 102 may indicate that the tenant F cryptographic key 191 should be stored on the key management service Z 190 at the data storage center 170, which may also include the tenant F host 171 and the tenant F data 181. At some point after cryptographic key migration has started on the server system 100, the tenant F host 171 may attempt to acquire the tenant F cryptographic key 191, at which time it will determine that the tenant F cryptographic key 191 is not located where the new KMS mapping 102 indicates, and request replication of the tenant F cryptographic key 191 to the key management service Z 190. This may similarly occur with the tenant G cryptographic key 192 and the tenant D cryptographic key 161. Any new tenant hosts, such as the tenant E host 142, may request that their cryptographic keys be generated on the KMS indicated in the new KMS mapping 102 as the KMS that should store their cryptographic keys. In this way, over time, all cryptographic keys may end up stored in the KMS that the new KMS mapping 103 indicates should store the cryptographic keys. In some implementations this may result in all cryptographic keys being stored at KMS at the same data storage center as their associated tenant hosts, though in other implementations the new KMS mapping 102 may indicate any KMS in any data storage center as the location at which a cryptographic key should be stored, regardless of the data storage center in which the tenant host associated with the cryptographic key is located. The monitoring system 101 may have event records that may allow visibility into the progress of the cryptographic key migration.

Figure 7:
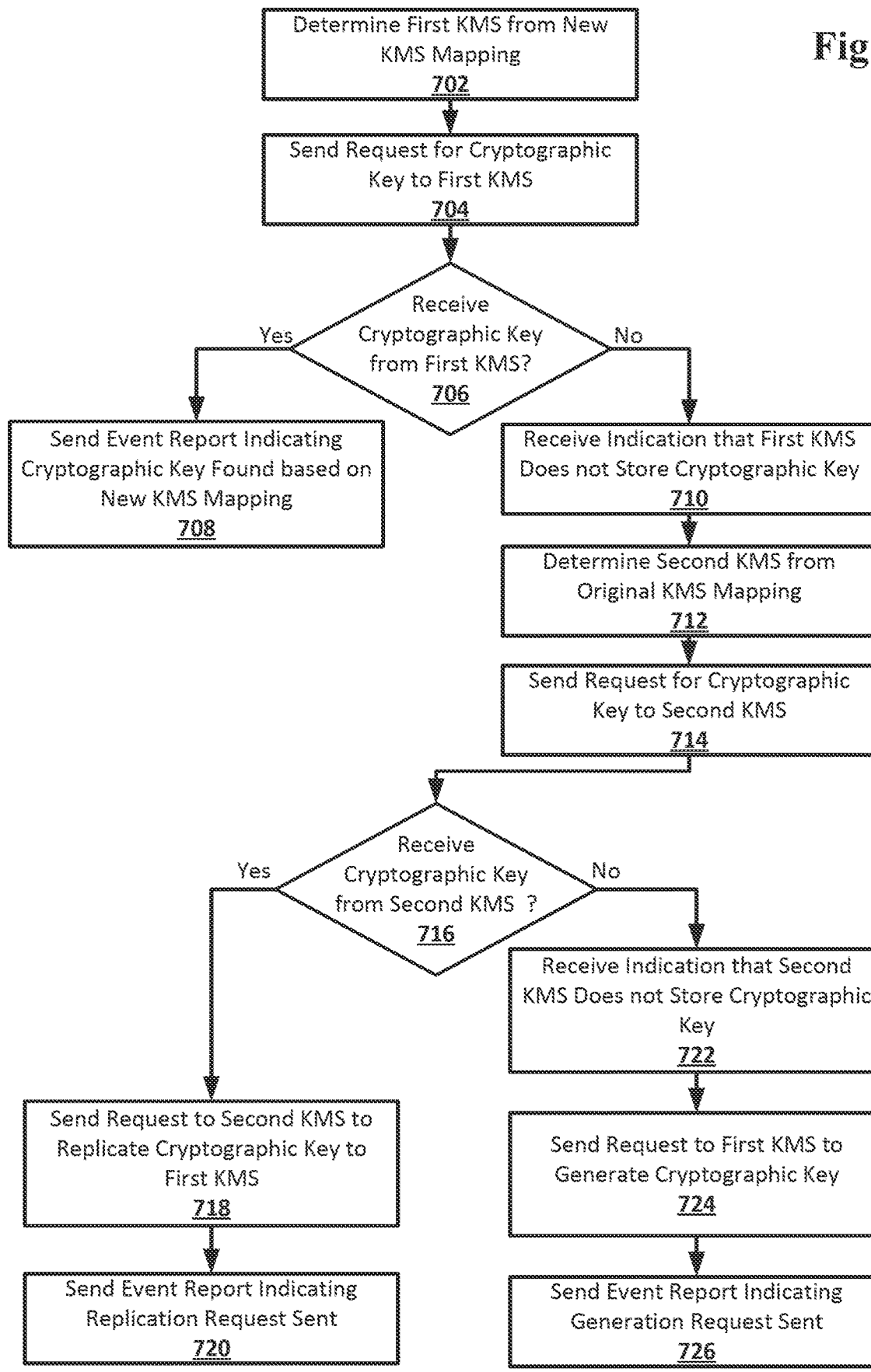
FIG. 7 shows an example procedure suitable for cryptographic key migration according to an implementation of the disclosed subject matter.

FIG. 7 shows an example procedure suitable for cryptographic key migration according to an implementation of the disclosed subject matter. At 702, a first KMS may be determined from a new KMS mapping. For example, the tenant A host 111, on starting, may need to acquire its associated cryptographic key, the tenant A cryptographic key 131, in order to work with the tenant A data 121. The tenant A host 111 may perform a lookup on the new KMS mapping 102 to determine which KMS of the server system 100 the KMS mapping 102 indicates stores the tenant A cryptographic key 131, for example, the key management service X 130.

At 704, a request for the cryptographic key may be sent to the first KMS. For example, the tenant A host 111 may send a request for the tenant A cryptographic key 131 to the key management service X 130 as determined from the new KMS mapping 102. The request may be sent, for example, through an API to a service of the key management service 130 and may include any suitable credentials that may be used by a KMS to determine whether a tenant host should be granted access to cryptographic key.

At 706, if the cryptographic key is received from the first KMS, flow may proceed to 708. For example, the key management service X 130, on receiving the request for the tenant A cryptographic key 131 from the tenant A host 111, may determine that it stores the tenant A cryptographic key 131 and send it to the tenant A host 111. The tenant A host 111 may receive the tenant A cryptographic key 131 through, for example, an API response. Otherwise, if the cryptographic key is not received from the first KSM, flow may proceed to 710. For example, the key management service X 130, on receiving the request for the tenant A cryptographic key 131 from the tenant A host 111, may determine that it does not store the tenant A cryptographic key 131.

At 708, an event report indicating that the cryptographic key was found based on the new KMS mapping may be sent. For example, the tenant A host 111, on receiving the tenant A cryptographic key 131 from the key management service X 130, may send an event report to the monitoring system 101. The event report may indicate that the tenant A host 111 found its associated cryptographic key in the KMS that was indicated in the new KMS mapping 102. The tenant A host 111 may cache the received tenant A cryptographic key 131 and use it to perform operations on the tenant A data 121 until the tenant A cryptographic key 131 is un-cached, for example, when the tenant A host 111 shuts down or restarts.

At 710, an indication that the first KMS does not store the cryptographic key may be received. For example, the tenant A host 111 may receive a message from the key management service X 130 indicating that the key management service X 130 does not store the tenant A cryptographic key 131. The message may be received, for example, through an API response.

At 712, a second KMS may be determined from an original KMS mapping. For example, the tenant A host 111, after receiving the message indicating that the key management service X 130 does not store the tenant A cryptographic key 131, may perform a lookup on the original KMS mapping 103 to determine which KMS of the server system 100 the KMS mapping 103 indicates stores the tenant A cryptographic key 131, for example, the key management service Y 160.

At 714, a request for the cryptographic key may be sent to the second KMS. For example, the tenant A host 111 may send a request for the tenant A cryptographic key 131 to the key management service X 130 as determined from the new KMS mapping 102. The request may be sent, for example, through an API to a service of the key management service 130 and may include any suitable credentials that may be used by a KMS to determine whether a tenant host should be granted access to cryptographic key.

At 716, if the cryptographic key is received from the second KMS, flow may proceed to 718. For example, the key management service Y 160, on receiving the request for the tenant A cryptographic key 131 from the tenant A host 111, may determine that it stores the tenant A cryptographic key 131 and send it to the tenant A host 111. The tenant A host 111 may receive the tenant A cryptographic key 131 through, for example, an API response. Otherwise, if the cryptographic key is not received from the second KSM, flow may proceed to 722. For example, the key management service Y 160, on receiving the request for the tenant A cryptographic key 131 from the tenant A host 111, may determine that it does not store the tenant A cryptographic key 131.

At 718, a request may be sent to the second KMS to replicate the key to the first KMS. For example, on receiving the tenant A cryptographic key 131 from the key management service Y 160, may send a request to the key management service Y 160 to replicate the tenant A cryptographic key 131 to the key management service X 130. This replication may result in the tenant A cryptographic key 131 being stored in the KMS that is already indicated by the new KMS mapping 102 as storing the tenant A cryptographic key 131, the key management service X 130. The replication request may be sent through, for example, an API to a service of the key management service Y 160 and may identify that the key management service X 130 as the location to which the tenant A cryptographic key 131 should be replicated. The replication may occur asynchronously, for example, at any time before the tenant A host 111 next restarts.

At 720, an event report indicating that the replication request was sent may be sent. For example, the tenant A host 111, after sending the request to the key management service Y 160 for the replication of the tenant A cryptographic key 131, may send an event report to the monitoring system 101. The event report may indicate that the tenant A host 111 sent the replication request to the key management service Y 160 requesting replication of the tenant A cryptographic key 131 to the key management service X 130. The tenant A host 111 may cache the received tenant A cryptographic key 131 and use it to perform operations on the tenant A data 121 until the tenant A cryptographic key 131 is un-cached, for example, when the tenant A host 111 shuts down or restarts. When the tenant A host 111 next attempts to acquire the tenant A cryptographic key 131, the key management service X 130 may store the tenant A cryptographic key 131 as indicated by the new KMS mapping 102. The tenant A host 111 may no longer need to perform a lookup on the original KMS mapping 103.

At 722, an indication that the second KMS does not store the cryptographic key may be received. For example, the tenant A host 111 may receive a message from the key management service Y 160 indicating that the key management service Y 160 does not store the tenant A cryptographic key 131. The message may be received, for example, through an API response.

At 724, a request may be sent to the first KMS to generate the cryptographic key. For example, if neither the key management service X 130 nor the key management service Y 160 stores the tenant A cryptographic key 131, the tenant A host 111 may send a request to the key management service X 130 to generate the tenant A cryptographic key 131. Sending the request to generate the tenant A cryptographic key 131 to the KMS indicated as already storing the tenant A cryptographic key 131 by the new KMS mapping 102 may ensure that after being generated the tenant A cryptographic key 131 will be found on that KMS, the key management service X 130.

At 726, an event report indicating that the generation request was sent may be sent. For example, the tenant A host 111, after sending the request to the key management service X 130 to generate the tenant A cryptographic key 131, may send an event report to the monitoring system 101. The event report may indicate that the tenant A host 111 sent the generation request to the key management service X 130 requesting generation of the tenant A cryptographic key 131. The tenant A host 111 may, sometime after request the generation of the tenant A cryptographic key 131, reattempt to acquire the tenant A cryptographic key 131 by performing a lookup on the new KMS mapping 102 to determine that it indicates that the tenant A cryptographic key 131 is stored on the key management service X 130. If the key management service X 130 has completed generation of the tenant A cryptographic key 131, the tenant A host 111 may be able to receive the tenant A cryptographic key 131 from the key management service X 130, as indicated by the new KMS mapping 102.

Figure 8:
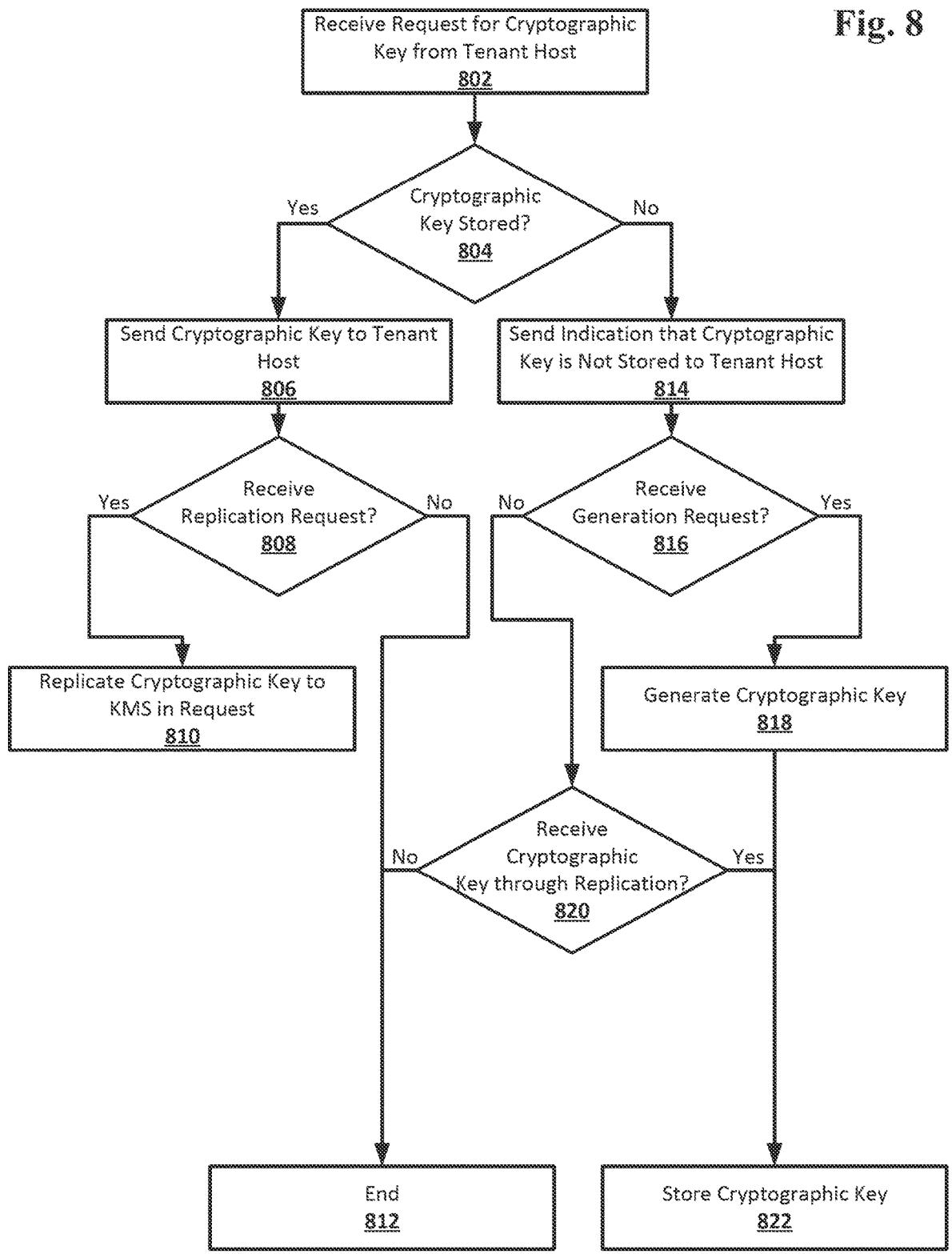
FIG. 8 shows an example procedure suitable for cryptographic key migration according to an implementation of the disclosed subject matter.

FIG. 8 shows an example procedure suitable for cryptographic key migration according to an implementation of the disclosed subject matter. At 802, a request for a cryptographic key may be received from a tenant host. For example, the key management service X 130 may receive a request for the tenant A cryptographic key 131 from the tenant A host 111. The request may be sent through an API to a service of the key management service X 130.

At 804, if the cryptographic key is stored, flow may proceed to 806. For example, the key management service X 130 may determine that it does store tenant A cryptographic key 131. Otherwise, if the cryptographic key is not found, flow may proceed to 814. For example, the key management service X 130 may determine that it does not store tenant A cryptographic key 131.

At 806, the cryptographic key may be sent to the tenant host. For example, if the key management service X 130 determined that it stored the tenant A cryptographic key 131, it may send the tenant A cryptographic key 131 to the tenant A host 111, for example, as an API response.

At 808, if a replication request is received, flow may proceed to 810. For example, if the key management service Y 160 received a request for the tenant A cryptographic key 131 from the tenant host 111 and sent the tenant A cryptographic key 131 to the tenant A host 111 in response, the tenant A host 111 may send a request to the key management service Y 160 to replicate the tenant A cryptographic key 131 to the key management service X 130. This may indicate that the key management service X 130 is indicated by the new KMS mapping 102 as the location where the tenant A cryptographic key 131 should be stored. Replication requests may include an indication of the KMS to which the cryptographic key should be replicated. The replication request may be received through, for example, an API of the key management service Y 160. Otherwise, if no replication request is received, flow may proceed to 812 and end. For example, if key management service X 130 received a request for the tenant A cryptographic key 131 from the tenant host 111 and sent the tenant A cryptographic key 131 to the tenant A host 111 in response, the tenant A host 111 may not need to request replication of the tenant A cryptographic key 131. The tenant A cryptographic key 131 may already be stored on the KMS where it is indicated as being stored by the new KMS mapping 102, the key management service X 130. The key management service X 130 may thus not receive a replication request.

At 810, the cryptographic key may be replicated to the KMS in the request. For example, the key management service Y 160 may replicate the tenant A cryptographic key 131 to the key management service X 130. The replication may be performed through APIs of the key management serer X 130 and the key management service Y 160 and may result in the tenant A cryptographic key 131 being stored on the key management service X 130. The replication may occur at any time after the replication is received and may be completed before the next time the tenant A host 111 restarts.

At 812, flow may end. The cryptographic key may already be stored on the KMS where it is indicated as being stored by the new KMS mapping 102 and may thus not need to be replicated or generated.

At 814, an indication that the cryptographic key is not stored may be sent. To the tenant host. For example, if the key management service X 130 determined that it does not store the tenant A cryptographic key 131, the key management service X 130 may send a message to the tenant A host 111 indicating that it does not store the tenant A cryptographic key 131. The message may be sent, for example, as an API response.

At 816, if a generation request is received, flow may proceed to 818. For example, if the key management service X 130 received a request for the tenant A cryptographic key 131 from the tenant host 111 and determined it did not store the tenant A cryptographic key 131, and the key management service Y 160 also received a request for the tenant A cryptographic key 131 from the tenant host 111 and determined it did not store the tenant A cryptographic key 131, this may indicate that the tenant A cryptographic key 131 has not been generated as it is not stored at the locations indicated in either of the new KMS mapping 102 and the original KMS mapping 103. The tenant A host 111 may request that the KMS indicated as storing the tenant A cryptographic key 131 by the new KMS mapping 102, the key management service X 130, generate the tenant A cryptographic key 131. The generation request may be received through, for example, an API of the key management service X 130. Otherwise, if no generation request is received, flow may proceed to 820. For example, if key management service Y 160 received a request for the tenant A cryptographic key 131 from the tenant host 111 and determined that it did not store the tenant A cryptographic key 131, the tenant A host 111 may request that the key management service X 130 generate the tenant A cryptographic key 131, and may not send a generation request to the key management service Y 130. The key management service X 130 may also not receive a generation request if, for example, the key management service X 130 received a request for the tenant A cryptographic key 131 from the tenant host 111 and determined it did not store the tenant A cryptographic key 131, and the key management service Y 160 also received a request for the tenant A cryptographic key 131 from the tenant host 111 and determined it did store the tenant A cryptographic key 131 and sent the tenant A cryptographic key 131 to the tenant A host 111. The tenant A host 111 may have sent a replication request to the key management service Y 160 and may thus not send a generation request to the key management service X 130.

At 818, a cryptographic key may be generated. For example, the key management service X 130 may generate the tenant A cryptographic key 131 after receiving the generation request from the tenant A host 111. The tenant A cryptographic key 131 may be generated in any suitable manner using any suitable cryptographic system or standard.

At 820, if a cryptographic key is received through replication, flow may proceed to 822. For example, if the key management service X 130 received a request from the tenant A host 111 for the tenant A cryptographic key 131 and determined it did not store the tenant A cryptographic key 131, but the key management service Y 160 determined that it did store the tenant A cryptographic key 131, the tenant A host 111 may have requested that the key management service Y 160 replicate the tenant A cryptographic key 131 to the key management service X 130. The key management service X 130 may receive the tenant A cryptographic key 131 through replication from the key management service Y 160. Otherwise, flow may proceed to 812 and end. For example, the key management service Y 160 may have received a request for the tenant A cryptographic key 131 after the key management service X 130 determined that it did not store the tenant A cryptographic key 131. The key management service Y 160 may have determined that it also did not store the tenant A cryptographic key 131. The tenant A host 111 may have then requested that the key management service X 130 generate the tenant A cryptographic key 131. Thus, the key management service Y 160 would not receive a request from the tenant A host 111 to generate the tenant A cryptographic key 131, and would also not receive the tenant A cryptographic key 131 through replication, as the key may be generated on the key management service X 130 which is where it should be stored in accordance with the indication in the new KMS mapping 102.

At 822, the cryptographic key may be stored. For example, the key management service X 130 may store the tenant A cryptographic key 131, whether it was generated by the key management service X 130 or received through replication from another KMS, so that it can be sent to the tenant A host 111 the next time the tenant A host 111 requests the tenant A cryptographic key 131.

Figure 9:
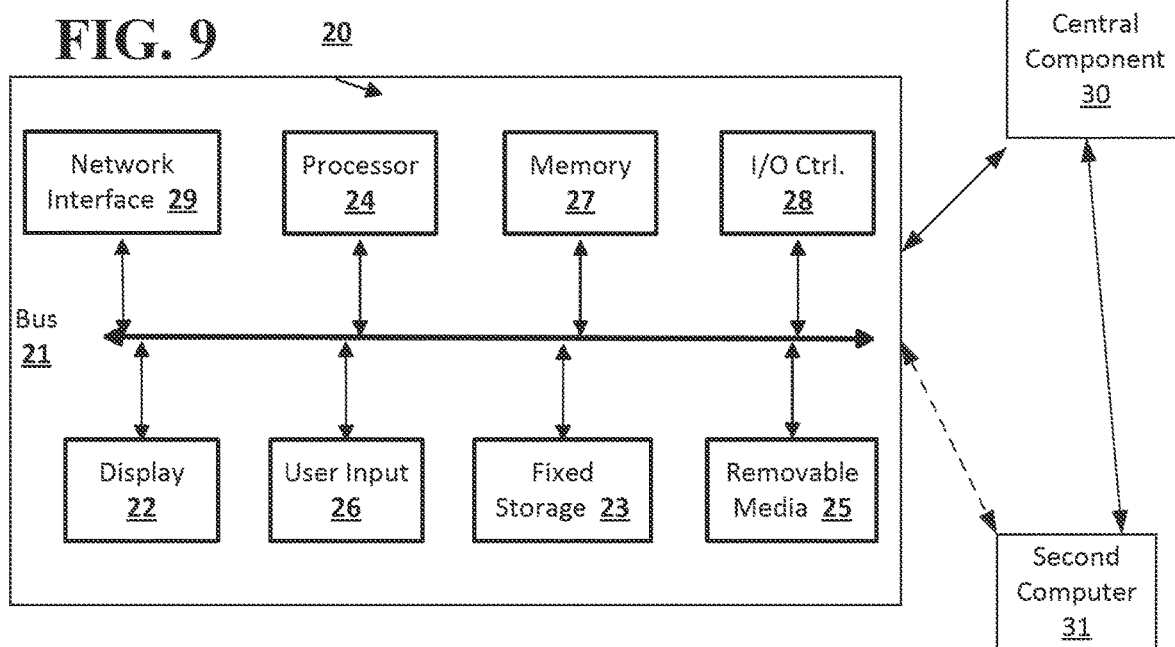
FIG. 9 shows a computer according to an implementation of the disclosed subject matter.

Implementations of the presently disclosed subject matter may be implemented in and used with a variety of component and network architectures. FIG. 9 is an example computer 20 suitable for implementing implementations of the presently disclosed subject matter. As discussed in further detail herein, the computer 20 may be a single computer in a network of multiple computers. As shown in FIG. 9, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 10.

Many other devices or components (not shown) may be connected in a similar manner (e.g., document scanners, digital cameras and so on). Conversely, all of the components shown in FIG. 9 need not be present to practice the present disclosure. The components can be interconnected in different ways from that shown. The operation of a computer such as that shown in FIG. 9 is readily known in the art and is not discussed in detail in this application. Code to implement the present disclosure can be stored in computer-readable storage media such as one or more of the memory 27, fixed storage 23, removable media 25, or on a remote storage location.

Figure 10:
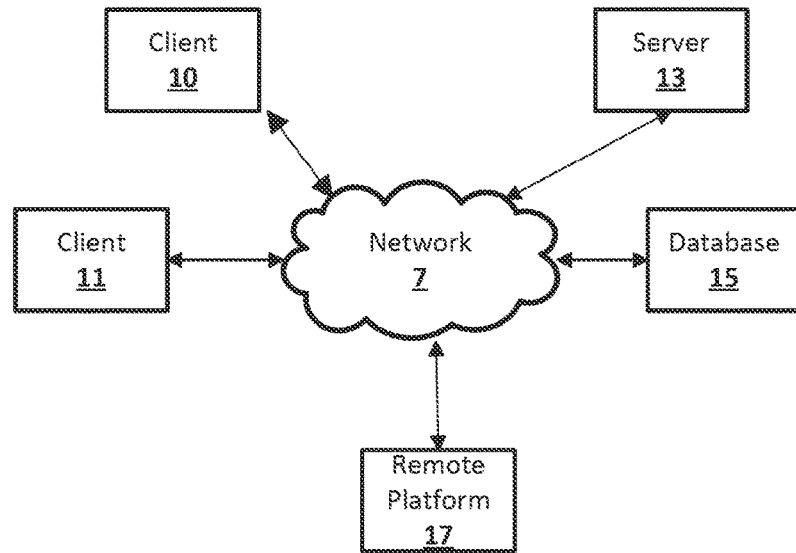
FIG. 10 shows a network configuration according to an implementation of the disclosed subject matter.

FIG. 10 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
   determining, by a tenant host, a first Key Management Service (KMS) indicated as storing a cryptographic key associated with the tenant host from a new KMS mapping;
   sending, to the first KMS, by the tenant host, a request for the cryptographic key associated with the tenant host;
   receiving at the tenant host an indication from the first KMS that the first KMS does not store the cryptographic key associated with the tenant host;
   determining, by a tenant host, a second KMS indicated as storing the cryptographic key associated with the tenant host from an original KMS mapping;
   receiving, at the tenant host from the second KMS, the cryptographic key associated with the tenant host; and
   sending, to the second KMS, by the tenant host, a request that the cryptographic key associated with the tenant host be replicated from the second KMS to the first KMS.

2. The computer-implemented method of claim 1, further comprising:
   replicating to the first KMS, by the second KMS, the cryptographic key associated with the tenant host.

3. The computer-implemented method of claim 2 further comprising tracking the replicating of the cryptographic key associated with the tenant host.

4. The computer-implemented method of claim 1, further comprising:
   sending to the first KMS, by a second tenant host, a request for a cryptographic key associated with the second tenant host;
   receiving at the second tenant host an indication from the first KMS that the first KMS does not store the cryptographic key associated with the second tenant host;
   sending to the second KMS, by the second tenant host, a request for the cryptographic key associated with the second tenant host;
   receiving at the second tenant host an indication from the second KMS that the second KMS does not store the cryptographic key associated with the second tenant host; and
   sending, to the first KMS, by the second tenant host, a request to generate the cryptographic key associated with the second tenant host.

5. The computer-implemented method of claim 4, further comprising after sending, to the first KMS, by the second tenant host, a request to generate the cryptographic key associated with the second tenant host, sending, by the second tenant host, an event report to a monitoring system wherein the event report indicates the sending of the request to generate the cryptographic key associated with the second tenant host.

6. The computer-implemented method of claim 1, further comprising after sending, to the second KMS, by the tenant host, a request that the cryptographic key associated with the tenant host be replicated from the second KMS to the first KMS, sending, by the tenant host, an event report to a monitoring system wherein the event report indicates the sending of the request that request that the cryptographic key associated with the tenant host be replicated.

7. The computer-implemented method of claim 1, further comprising:
   determining, by a tenant host, the first Key Management Service (KMS) indicated as storing a cryptographic key associated with the tenant host from the new KMS mapping;
   sending, to the first KMS, by the tenant host, a request for the cryptographic key associated with the tenant host; and
   receiving at the tenant host from the first KMS the cryptographic key associated with the tenant host.

8. A computer-implemented system comprising:
a storage; and
a processor that runs a tenant host and determines, a first Key Management Service (KMS) indicated as storing a cryptographic key associated with the tenant host from a new KMS mapping,
sends to the first KMS a request for the cryptographic key associated with the tenant host,
receives an indication from the first KMS that the first KMS does not store the cryptographic key associated with the tenant host,
determines a second KMS indicated as storing the cryptographic key associated with the tenant host from an original KMS mapping,
receives from the second KMS the cryptographic key associated with the tenant host, and
sends to the second KMS a request that the cryptographic key associated with the tenant host be replicated from the second KMS to the first KMS.

9. The computer-implemented system of claim 8, further comprising a second processor of the second KMS that replicates to the first KMS the cryptographic key associated with the tenant host.

10. The computer-implemented system of claim 9, wherein a third processor further tracks the replicating of the cryptographic key associated with the tenant host.

11. The computer-implemented system of claim 8 wherein the processor further runs a second tenant host and sends to the first KMS a request for a cryptographic key associated with the second tenant host,
receives at the second tenant host an indication from the first KMS that the first KMS does not store the cryptographic key associated with the second tenant host,
sends to the second KMS a request for the cryptographic key associated with the second tenant host,
receives an indication from the second KMS that the second KMS does not store the cryptographic key associated with the second tenant host, and
sends to the first KMS a request to generate the cryptographic key associated with the second tenant host.

12. The computer-implemented system of claim 11, wherein the processor further, after sending, to the first KMS a request to generate the cryptographic key associated with the second tenant host, sends an event report to a monitoring system wherein the event report indicates the sending of the request to generate the cryptographic key associated with the second tenant host.

13. The computer-implemented system of claim 8, wherein the processor further, after sending, to the second KMS a request that the cryptographic key associated with the tenant host be replicated from the second KMS to the first KMS, sends an event report to a monitoring system wherein the event report indicates the sending of the request that request that the cryptographic key associated with the tenant host be replicated.

14. The computer-implemented system of claim 8, wherein the processor further determines the first Key Management Service (KMS) indicated as storing a cryptographic key associated with the tenant host from the new KMS mapping,
sends to the first KMS a request for the cryptographic key associated with the tenant host, and
receives from the first KMS the cryptographic key associated with the tenant host.

15. A system comprising: one or more computers and one or more non-transitory storage devices storing instructions which are operable, when executed by the one or more computers, to cause the one or more computers to perform operations comprising:
determining, by a tenant host, a first Key Management Service (KMS) indicated as storing a cryptographic key associated with the tenant host from a new KMS mapping;
sending, to the first KMS, by the tenant host, a request for the cryptographic key associated with the tenant host;
receiving at the tenant host an indication from the first KMS that the first KMS does not store the cryptographic key associated with the tenant host;
determining, by a tenant host, a second KMS indicated as storing the cryptographic key associated with the tenant host from an original KMS mapping;
receiving, at the tenant host from the second KMS, the cryptographic key associated with the tenant host; and
sending, to the second KMS, by the tenant host, a request that the cryptographic key associated with the tenant host be replicated from the second KMS to the first KMS.

16. The system of claim 15, wherein the one or more computers and one or more non-transitory storage devices further store instructions which are operable, when executed by the one or more computers, to cause the one or more computers to further perform operations comprising:
replicating to the first KMS, by the second KMS, the cryptographic key associated with the tenant host.

17. The system of claim 15, wherein the one or more computers and one or more non-transitory storage devices further store instructions which are operable, when executed by the one or more computers, to cause the one or more computers to further perform operations comprising:
sending to the first KMS, by a second tenant host, a request for a cryptographic key associated with the second tenant host;
receiving at the second tenant host an indication from the first KMS that the first KMS does not store the cryptographic key associated with the second tenant host;
sending to the second KMS, by the second tenant host, a request for the cryptographic key associated with the second tenant host;
receiving at the second tenant host an indication from the second KMS that the second KMS does not store the cryptographic key associated with the second tenant host; and
sending, to the first KMS, by the second tenant host, a request to generate the cryptographic key associated with the second tenant host.

18. The system of claim 17, wherein the one or more computers and one or more non-transitory storage devices further store instructions which are operable, when executed by the one or more computers, to cause the one or more computers to further perform operations comprising:
after sending, to the first KMS, by the second tenant host, a request to generate the cryptographic key associated with the second tenant host, sending, by the second tenant host, an event report to a monitoring system wherein the event report indicates the sending of the request to generate the cryptographic key associated with the second tenant host.

19. The system of claim 15, wherein the one or more computers and one or more non-transitory storage devices further store instructions which are operable, when executed by the one or more computers, to cause the one or more computers to further perform operations comprising:

after sending, to the second KMS, by the tenant host, a request that the cryptographic key associated with the tenant host be replicated from the second KMS to the first KMS, sending, by the tenant host, an event report to a monitoring system wherein the event report indicates the sending of the request that request that the cryptographic key associated with the tenant host be replicated.

20. The system of claim 15, wherein the one or more computers and one or more non-transitory storage devices further store instructions which are operable, when executed by the one or more computers, to cause the one or more computers to further perform operations comprising:

determining, by a tenant host, the first Key Management Service (KMS) indicated as storing a cryptographic key associated with the tenant host from the new KMS mapping;

sending, to the first KMS, by the tenant host, a request for the cryptographic key associated with the tenant host; and receiving at the tenant host from the first KMS the cryptographic key associated with the tenant host.

\* \* \* \* \*